(12) United States Patent
Park

(10) Patent No.: US 10,097,715 B2
(45) Date of Patent: Oct. 9, 2018

(54) IMAGE FORMING APPARATUS AND METHOD FOR SELECTING A POWER CONSUMPTION MODE BASED ON A DISTANCE TO A USER

(71) Applicant: S-Printing Solution Co., Ltd., Suwon-si, Gyeonggi-do (KR)

(72) Inventor: Sung-joon Park, Hwaseong-si (KR)

(73) Assignee: S-Printing Solution Co., Ltd., Suwon-si (KR)

(*) Notice: Subject to any disclaimer, the term of this patent is extended or adjusted under 35 U.S.C. 154(b) by 0 days.

(21) Appl. No.: 15/381,706

(22) Filed: Dec. 16, 2016

(65) Prior Publication Data
US 2017/0195508 A1 Jul. 6, 2017

(30) Foreign Application Priority Data
Jan. 6, 2016 (KR) .................. 10-2016-0001618

(51) Int. Cl.
*H04N 1/00* (2006.01)
*G01S 13/04* (2006.01)
*G01S 13/89* (2006.01)
*H04N 1/44* (2006.01)
*G01S 13/02* (2006.01)

(52) U.S. Cl.
CPC ......... *H04N 1/00896* (2013.01); *G01S 13/04* (2013.01); *G01S 13/89* (2013.01); *H04N 1/00037* (2013.01); *H04N 1/00058* (2013.01); *H04N 1/00891* (2013.01); *H04N 1/4406* (2013.01); *G01S 13/0209* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,822,077 A | * | 10/1998 | Sasaki | H04N 1/00885 340/435 |
| 8,014,947 B2 | * | 9/2011 | Pearce | G01C 21/00 358/1.15 |
| 9,098,797 B2 | | 8/2015 | Yamano | |
| 9,148,542 B2 | * | 9/2015 | Imamura | H04N 1/00896 |
| 9,661,473 B1 | * | 5/2017 | Jarvis | H04W 4/043 |
| 2003/0158815 A1 | * | 8/2003 | Yoshida | G06F 21/31 705/50 |
| 2007/0149124 A1 | * | 6/2007 | Onozawa | H04B 5/0062 455/41.2 |

(Continued)

*Primary Examiner* — Miya J Williams
(74) *Attorney, Agent, or Firm* — Jefferson IP Law, LLP

(57) ABSTRACT

An image forming apparatus and a method of controlling the image forming apparatus are provided. The method includes receiving a reflection signal corresponding to a transmission signal transmitted from the image forming apparatus to a user sensing area, the reflection signal being reflected from a user, determining a distance between the image forming apparatus and the user, based on the received reflection signal, selecting a power consumption mode corresponding to the determined distance from among a plurality of power consumption modes, based on the distance between the image forming apparatus and the user, and performing user authentication or power control according to the selected power consumption mode.

20 Claims, 15 Drawing Sheets

(56) References Cited

U.S. PATENT DOCUMENTS

| | | | |
|---|---|---|---|
| 2011/0082846 A1* | 4/2011 | Bamba | H04W 24/08 707/702 |
| 2012/0038946 A1* | 2/2012 | Monma | H04N 1/00501 358/1.15 |
| 2012/0188605 A1* | 7/2012 | Wada | G06F 3/1204 358/1.15 |
| 2013/0194626 A1* | 8/2013 | Sakurai | G06F 3/1296 358/1.15 |
| 2015/0094090 A1* | 4/2015 | Phan | H04W 4/028 455/456.1 |
| 2015/0161493 A1* | 6/2015 | Wilsher | G06K 15/406 358/1.14 |
| 2015/0169597 A1* | 6/2015 | Edge | G06F 17/3087 707/751 |
| 2015/0237228 A1* | 8/2015 | Okuzono | H04N 1/00896 358/1.13 |
| 2015/0253719 A1 | 9/2015 | Matsumoto | |
| 2015/0261159 A1 | 9/2015 | Horishita et al. | |
| 2016/0277617 A1* | 9/2016 | Ogawa | H04N 1/00891 |
| 2017/0155793 A1* | 6/2017 | Masumoto | G06F 3/1222 |

* cited by examiner

IMAGE FORMING APPARATUS AND METHOD FOR SELECTING A POWER CONSUMPTION MODE BASED ON A DISTANCE TO A USER

CROSS-REFERENCE TO RELATED APPLICATION(S)

This application claims the benefit under 35 U.S.C. § 119(a) of a Korean patent application filed on Jan. 6, 2016 in the Korean Intellectual Property Office and assigned Serial number 10-2016-0001618, the entire disclosure of which is hereby incorporated by reference.

TECHNICAL FIELD

The present disclosure relates to an image forming apparatus and a method of controlling the same.

BACKGROUND

In order to drive image forming apparatuses such as printers, facsimile devices, photocopiers, etc., a certain amount of power should be supplied to the image forming apparatuses. Recently, in order to efficiently control power consumed by such image forming apparatuses, technologies for changing a mode of an image forming apparatus from a normal use mode to a power saving mode when the image forming apparatus does not operate for a certain period of time have been developed.

However, in such technologies, when an image forming apparatus is in the power saving mode, much time is taken until a user changes the power saving mode to the normal use mode for using the image forming apparatus, and for this reason, the user cannot be quickly supplied with an image forming operation. Therefore, the necessity for technology for more efficiently controlling power consumed by image forming apparatuses is increasing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus and a method of controlling the same, in which a user determines whether to perform an image forming operation in the image forming apparatus, based on a location of the user, and efficiently controls power consumption according to a result of the determination.

In accordance with an aspect of the present disclosure, a method of controlling an image forming apparatus is provided. The method includes receiving a reflection signal corresponding to a transmission signal which is transmitted from the image forming apparatus to a user sensing area, the reflection signal being reflected from a user, determining a distance between the image forming apparatus and the user, based on the received reflection signal, selecting a power consumption mode corresponding to the determined distance from among a plurality of power consumption modes, based on the distance between the image forming apparatus and the user, and performing user authentication or power control according to the selected power consumption mode.

The plurality of power consumption modes may include a power saving mode and a power non-saving mode, wherein power is supplied to some of a plurality of modules included in the image forming apparatus, and wherein in the power non-saving mode, power is supplied to each of the plurality of modules.

The power saving mode may be classified into a first power saving mode and a second power saving mode, based on a type of module supplied with power among the plurality of modules, and the selecting of the power consumption mode may include, selecting the power non-saving mode when the distance between the image forming apparatus and the user is less than a threshold distance, selecting the first power saving mode when the distance between the image forming apparatus and the user is equal to or more than the threshold distance in the user sensing area, and selecting the second power saving mode when the user is located outside the user sensing area and the reflection signal is not received.

The selecting of the power consumption mode may include, when the reflection signal is not received and power of the image forming apparatus is less than a certain value, selecting the second power saving mode.

The performing of the user authentication or the power control may include, when the user is located within a certain distance from the image forming apparatus for a threshold period of time or more, obtaining authentication information necessary for the user authentication from a terminal of the user.

The method may further includes setting a weight value of at least one location in the user sensing area, based on previously determined moving route information about the user.

The method may further include determining coordinates representing a location of the user on a coordinate plane which is set with respect to the image forming apparatus and determining a weight value corresponding to the determined coordinates.

The method may further include sensing a moving route of the user, based on a reflection signal received by a certain time unit and comparing a threshold value with a weight value corresponding to at least one location on the sensed moving route of the user to determine a time for changing the plurality of power consumption modes.

The transmission signal may include an ultra-wide band (UWB) radar signal.

The method may further include determining an output intensity of the transmission signal, based on the user sensing area.

In accordance with another aspect of the present disclosure, an image forming apparatus is provided. The image forming apparatus may include an image former configured to perform an image forming operation, a signal transceiver configured to receive a reflection signal corresponding to a transmission signal which is transmitted from the image forming apparatus to a user sensing area and is reflected from a user, at least one processor configured to determine a distance between the image forming apparatus and the user, based on the received reflection signal and select a power consumption mode corresponding to the determined distance from among a plurality of power consumption modes, based on the distance between the image forming apparatus and the user, and a power supply configured to supply power to the image forming apparatus, based on the selected power consumption mode, wherein the at least one processor is further configured to perform user authentication or power control according to the selected power consumption mode.

The plurality of power consumption modes may include a power saving mode and a power non-saving mode, wherein power is supplied to some of a plurality of modules included in the image forming apparatus, and wherein in the power non-saving mode, power is supplied to each of the plurality of modules.

The power saving mode may be classified into a first power saving mode and a second power saving mode, based on a type of module supplied with the power among the plurality of modules. When the determined distance between the image forming apparatus and the user is less than a threshold distance, the at least one processor may select the power non-saving mode. When the distance between the image forming apparatus and the user is equal to or more than the threshold distance in the user sensing area, the at least one processor may select the first power saving mode, and when the user is located outside the user sensing area and the reflection signal is not received, the at least one processor may select the second power saving mode.

When the reflection signal is not received and power of the image forming apparatus is less than a certain value, the at least one processor may select the second power saving mode.

The image forming apparatus may further include a communicator configured to, when the user is located within a certain distance from the image forming apparatus for a threshold period of time or more, obtain authentication information necessary for the user authentication from a terminal of the user.

The at least one processor may set a weight value of at least one location in the user sensing area, based on previously determined moving route information about the user.

The at least one processor may determine coordinates representing a location of the user on a coordinate plane which is set with respect to the image forming apparatus, and may determine a weight value corresponding to the determined coordinates.

The at least one processor may sense a moving route of the user, based on a reflection signal received by a certain time unit and may compare a threshold value with a weight value corresponding to at least one location on the sensed moving route of the user to determine a time for changing the plurality of power consumption modes.

The transmission signal may include a UWB radar signal.

The at least one processor may determine an output intensity of the transmission signal, based on the user sensing area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
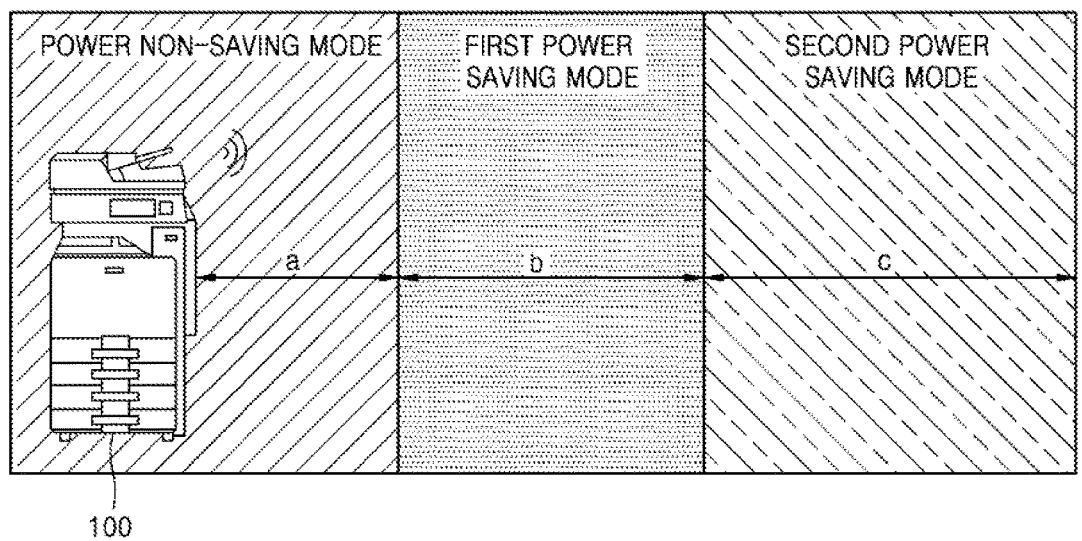
FIG. 1 is a conceptual diagram for illustrating a method of controlling an image forming apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be briefly described, and the inventive concept will be described in detail.

Terms used in the inventive concept have been selected as general terms which are widely used at present, in consideration of the functions of the inventive concept, but may be altered according to the intent of an operator of ordinary skill in the art, practice of the related art, or introduction of new technology. Also, if there is a term which is arbitrarily selected by the applicant in a specific case, in which case a meaning of the term will be described in detail in a corresponding description portion of the inventive concept. Therefore, the terms should be defined on the basis of the entire content of this specification instead of a simple name of each of the terms.

In this disclosure below, when it is described that one comprises (or includes or In this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as " . . . unit", " . . . apparatus" and "module" described in specification denotes an element for performing at least one function or operation, and may be implemented in hardware, software or the combination of hardware and software.

Hereinafter, various embodiments will be described in detail to be easily embodied by those of ordinary skill in the art with reference to the accompanying drawings. The inventive concept may, however, be embodied in many different forms and should not be construed as being limited to the various embodiments set forth herein. In the accompanying drawings, a portion irrelevant to a description of the inventive concept will be omitted for clarity. Moreover, like reference numerals refer to like elements throughout.

FIG. 1 is a conceptual diagram for illustrating a method of controlling an image forming apparatus 100 according to an embodiment of the present disclosure.

Referring to FIG. 1, the image forming apparatus 100 may determine a location of a user and may select a power consumption mode of the image forming apparatus 100, based on the determined location of the user. Also, the image forming apparatus 100 may determine a module, to which power is supplied, from among a plurality of modules included in the image forming apparatus 100 according to the selected power consumption mode.

The image forming apparatus 100 according to an embodiment of the present disclosure may sense a reflection signal, corresponding to a transmission signal which is transmitted from the image forming apparatus 100 to a predetermined user sensing area and is reflected from the user, to determine the location of the user. For example, the image forming apparatus 100 may determine the location of the user by using a time difference between a time when the transmission signal is transmitted and a time when the reflection signal is sensed. As the location of the user is determined, the image forming apparatus 100 may determine a distance between the image forming apparatus 100 and the user and may select a power consumption mode, corresponding to the distance between the image forming apparatus 100 and the user, from among a plurality of power consumption modes.

Here, the plurality of power consumption modes may include a power non-saving mode, a first power saving mode, and a second power saving mode. When the power non-saving mode is selected, the image forming apparatus 100 may supply power to each of the plurality of modules included in the image forming apparatus 100. According to another embodiment, when the first power saving mode is selected, the image forming apparatus 100 may supply power to a predetermined first module group among the plurality of modules. According to another embodiment, when the second power saving mode is selected, the image forming apparatus 100 may supply the power to a predetermined second module group among the plurality of modules.

Moreover, the image forming apparatus 100 according to an embodiment of the present disclosure may previously determine a distance corresponding to each of the plurality of power consumption modes. For example, as illustrated in FIG. 1, when the user is located within a distance a with respect to the image forming apparatus 100, the image forming apparatus 100 may select the power non-saving mode. Also, when the user is located at the distance a or more and less than a distance b with respect to the image forming apparatus 100, the image forming apparatus 100 may select the first power saving mode. Also, when the user is located in an area spaced apart from the image forming apparatus 100 by the distance b or more, the image forming apparatus 100 may select the second power saving mode. The image forming apparatus 100 may control power consumed by the plurality of modules included in the image forming apparatus 100 according to the distance between the user and the image forming apparatus 100, thereby increasing power consumption efficiency.

The image forming apparatus 100 according to an embodiment of the present disclosure may perform authentication of determining whether the user is a registered user, based on the selected power consumption mode. For example, when the user is located within a range of less than the distance a for a threshold period of time or more with respect to the image forming apparatus 100, the image forming apparatus 100 may obtain authentication information from the user and perform authentication by using the obtained authentication information. The image forming apparatus 100 may determine whether the user will perform an image forming operation, based on the location of the user and may previously authenticate the user, thereby providing an environment which enables the user to more quickly perform the image forming operation.

Figure 2:
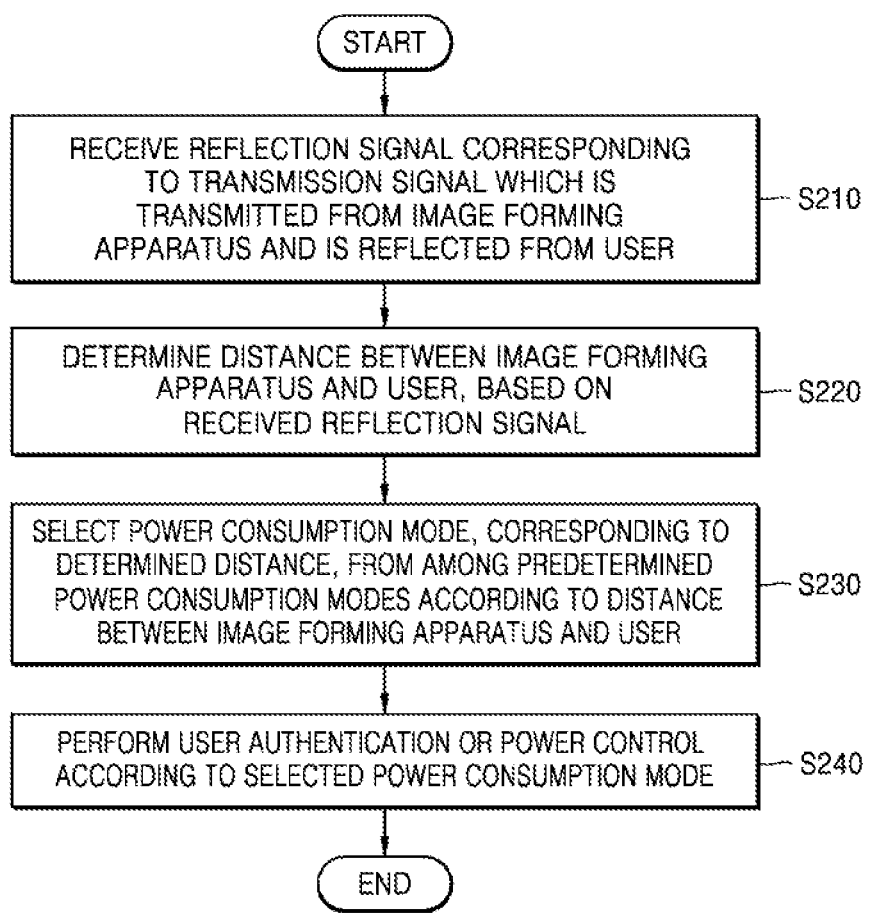
FIG. 2 is a flowchart of a method of controlling an image forming apparatus according to an embodiment of the present disclosure.

FIG. 2 is a flowchart of a method of controlling the image forming apparatus 100 according to an embodiment of the present disclosure.

Referring to FIG. 2, in operation S210, the image forming apparatus 100 may receive a reflection signal corresponding to a transmission signal which is transmitted from the image forming apparatus 100 to a predetermined user sensing area and is reflected from a user.

The image forming apparatus 100 according to an embodiment of the present disclosure may receive the transmission signal which is an electromagnetic wave having a certain bandwidth, for determining whether the user is located in the user sensing area. Here, the user sensing area may be previously determined by the image forming apparatus 100, based on a distance range where the use of the image forming apparatus 100 by the user is predicted. Also, the image forming apparatus 100 may control an output intensity of the transmission signal in order for the transmission signal to reach the user sensing area. For example, the output intensity of the transmission signal may increase so as to enlarge the user sensing area previously determined by the image forming apparatus 100.

The image forming apparatus 100 according to an embodiment of the present disclosure may use an electromagnetic wave of an ultra-wide band (UWB) as the transmission signal for sensing the user. By using the electromagnetic wave of the UWB, the image forming apparatus 100 may more accurately determine a location of the user with low power. Characteristic of the electromagnetic wave of the UWB will be described in detail with reference to FIG. 3.

In operation S220, the image forming apparatus 100 may determine a distance between the image forming apparatus 100 and the user, based on the received reflection signal.

The image forming apparatus 100 according to an embodiment of the present disclosure may determine the location of the user by using a time difference between a transmission time of the transmission signal and a reception time of the reflection signal. For example, the image forming apparatus 100 may receive a reflection signal, corresponding to each of two transmission signals which are transmitted from the image forming apparatus 100 and are reflected from the user, to determine the location of the user on a two-dimensional (2D) plane.

Moreover, the location of the user may be determined as coordinates on a coordinate plane which is set with respect to the image forming apparatus 100. For example, the location of the user may be determined as coordinates on a circular coordinate plane where the image forming apparatus 100 is located in a center of the circular coordinate plane. According to another embodiment, the location of the user may be determined as coordinates on a fan-shaped coordinate plane with the image forming apparatus 100 as a vertex. The fan-shaped coordinate plane may be determined according to a setting by the user. The image forming apparatus 100 according to an embodiment of the present disclosure may determine a distance between the image forming apparatus 100 and the user according to the location of the user being determined.

When the reflection signal is not sensed, the image forming apparatus 100 may determine the user as not being located in the user sensing area.

In operation S230, the image forming apparatus 100 may select a power consumption mode, corresponding to the determined distance, from among a plurality of predetermined power consumption modes according to the distance between the image forming apparatus 100 and the user. Here, the plurality of power consumption modes may include a power saving mode and a power non-saving mode. Also, the power saving mode may be classified into a first power saving mode and a second power saving mode based on the kind of a module, to which power is supplied, among a plurality of modules included in the image forming apparatus 100. However, this is merely one embodiment, and the power saving mode may be classified into another power saving mode in addition to the first power saving mode and the second power saving mode.

The image forming apparatus 100 may set a distance corresponding to each of the plurality of power consumption modes. For example, when the user is located in an area within a threshold distance from the image forming apparatus 100, the image forming apparatus 100 may select the power non-saving mode. According to an embodiment of the present disclosure, when the user is located in an area of the user sensing area from the threshold distance with respect to the image forming apparatus 100, the image forming apparatus 100 may select the first power saving mode. According to another embodiment, when the user is located in an area outside the user sensing area, the image forming apparatus 100 may select the second power saving mode.

In operation S240, the image forming apparatus 100 may perform user authentication or power control according to the selected power consumption mode.

The image forming apparatus 100 may supply the power to at least some of the plurality of modules included in the image forming apparatus 100 according to the selected power consumption mode. A method of supplying, by the image forming apparatus 100, the power to at least some of the plurality of modules in each of the plurality of power consumption modes will be described in detail with reference to FIG. 5.

Moreover, according to another embodiment, before providing an image forming operation to the user, the image forming apparatus 100 may perform authentication for determining whether the user is a registered user. When the power non-saving mode is selected according to the user being located within the threshold distance from the image forming apparatus 100, the image forming apparatus 100 may obtain authentication information from the user. Also, according to another embodiment, when it is determined that the user is located within the threshold distance from the image forming apparatus 100 for a predetermined threshold period of time, the image forming apparatus 100 may obtain the authentication information from the user.

The image forming apparatus 100 may compare the authentication information obtained from the user and at least one piece of registered user authentication information, and when it is determined that the user is an authenticated user, the image forming apparatus 100 may provide the image forming operation to the user.

Figure 3:
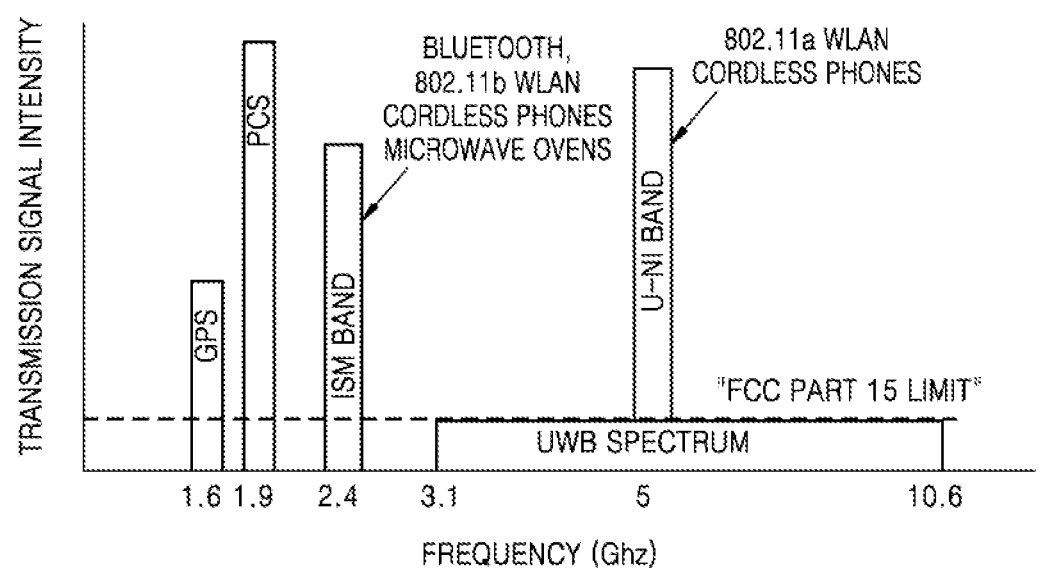
FIG. 3 is a graph for illustrating a characteristic of a transmission signal transmitted from an image forming apparatus according to an embodiment of the present disclosure.

FIG. 3 is a graph for illustrating a characteristic of a transmission signal transmitted from the image forming apparatus 100 according to an embodiment of the present disclosure.

Referring to FIG. 3, a graph showing a bandwidth and intensity of an electromagnetic wave used in various communication technologies is shown. The image forming apparatus 100 according to an embodiment of the present disclosure may transmit an electromagnetic wave of UWB to a predetermined user sensing area as a transmission signal for determining a location of a user. The electromagnetic wave of the UWB is low in signal intensity and thus does not cause interference to another communication system. Also, by using the electromagnetic wave of the UWB, the image forming apparatus 100 may transmit the electromagnetic wave with low power over a wide band. For example, the image forming apparatus 100 may transmit an electromagnetic wave having 100 Mbps or more in a band of 3.1 GHz to 10.6 GHz, for sensing the user.

Moreover, by using the electromagnetic wave of the UWB, the image forming apparatus 100 may easily determine the location of the user even when an obstacle such as a wall and/or the like is located. For example, the electromagnetic wave of the UWB passes through a medium, and thus, when the image forming apparatus 100 receives a reflected wave reflected from the obstacle and a reflected wave reflected from the user, the image forming apparatus 100 may identify the reflected wave reflected from the user to determine the location of the user.

Figure 4A:
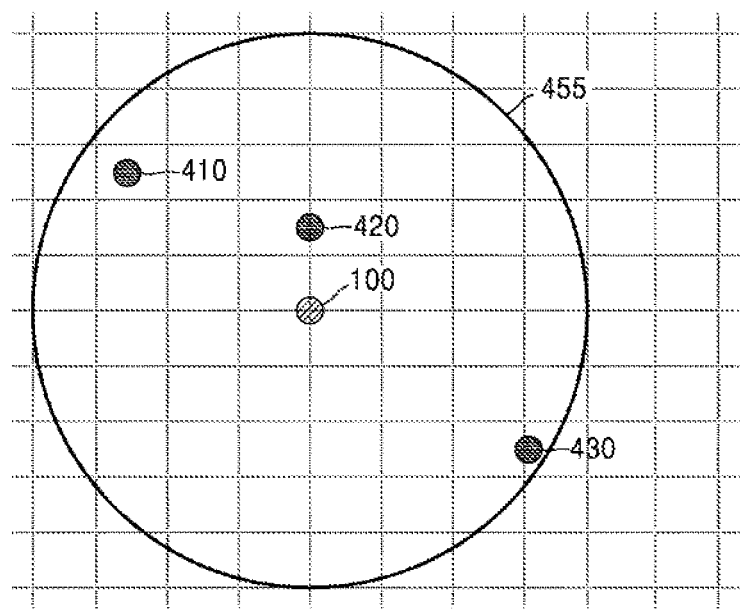
FIGS. 4A and 4B are diagrams for illustrating a method of checking, by an image forming apparatus, a location of a user according to various embodiments of the present disclosure.
Figure 4B:
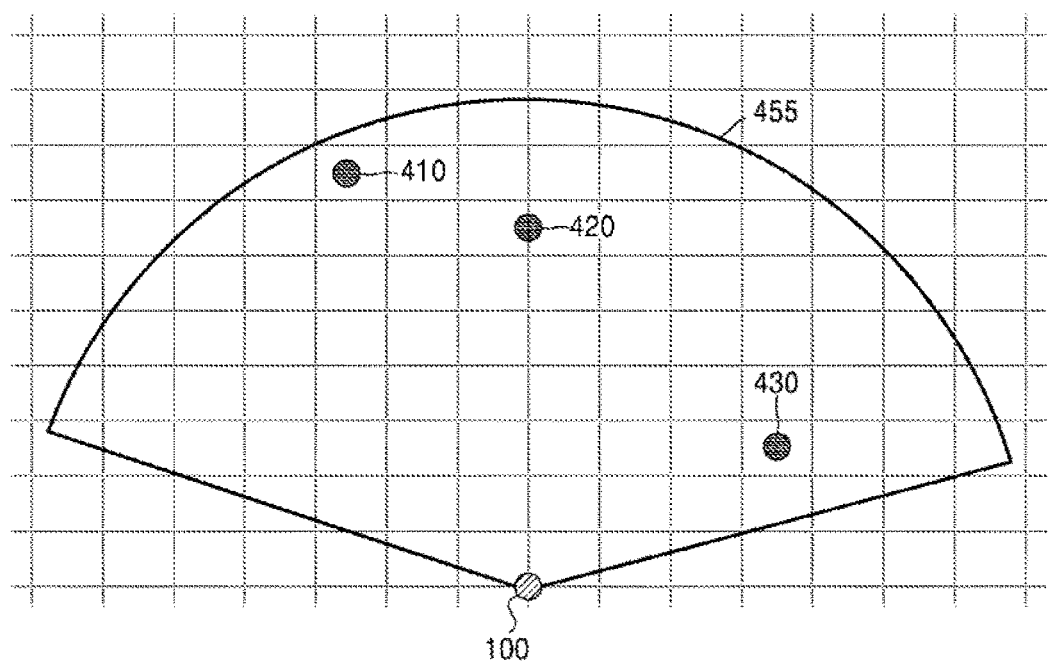

FIGS. 4A and 4B are diagrams for illustrating a method of checking, by an image forming apparatus, a location of a user according to various embodiments of the present disclosure.

Referring to FIG. 4A, the image forming apparatus 100 according to an embodiment of the present disclosure may transmit a transmission signal to a predetermined user sensing area 455. Also, the image forming apparatus 100 may transmit two or more transmission signals to the predetermined user sensing area 455, for determining a location of a user on a 2D plane. When the user is located within the user sensing area 455, the image forming apparatus 100 may sense a reflection signal reflected from the user.

For example, the image forming apparatus 100 may sense a reflection signal generated through reflection by each of a first user 410, a second user 420, and a third user 430 which are located in the user sensing area 455. The image forming apparatus 100 may determine locations of the first to third users 410, 420 and 430, based on a time difference between a transmission time of a transmission signal and a reception time of the reflection.

A location of a user may be determined as coordinates on a coordinate plane which is set with respect to the image forming apparatus 100. For example, the image forming apparatus 100 may display the location of each of the first to third users 410, 420 and 430 as coordinates on a circular coordinate plane which is set with respect to the image forming apparatus 100. However, this is merely one embodiment, and the coordinate plane generated by the image forming apparatus 100 is not limited to the circular coordinate plane.

Referring to FIG. 4B, the image forming apparatus 100 may display the location of each of the first to third users 410, 420 and 430 as coordinates on a fan-shaped coordinate plane with the image forming apparatus 100 as a vertex.

The coordinate plane generated by the image forming apparatus 100 according to an embodiment of the present disclosure may be determined according to a setting by a user.

Figure 5:
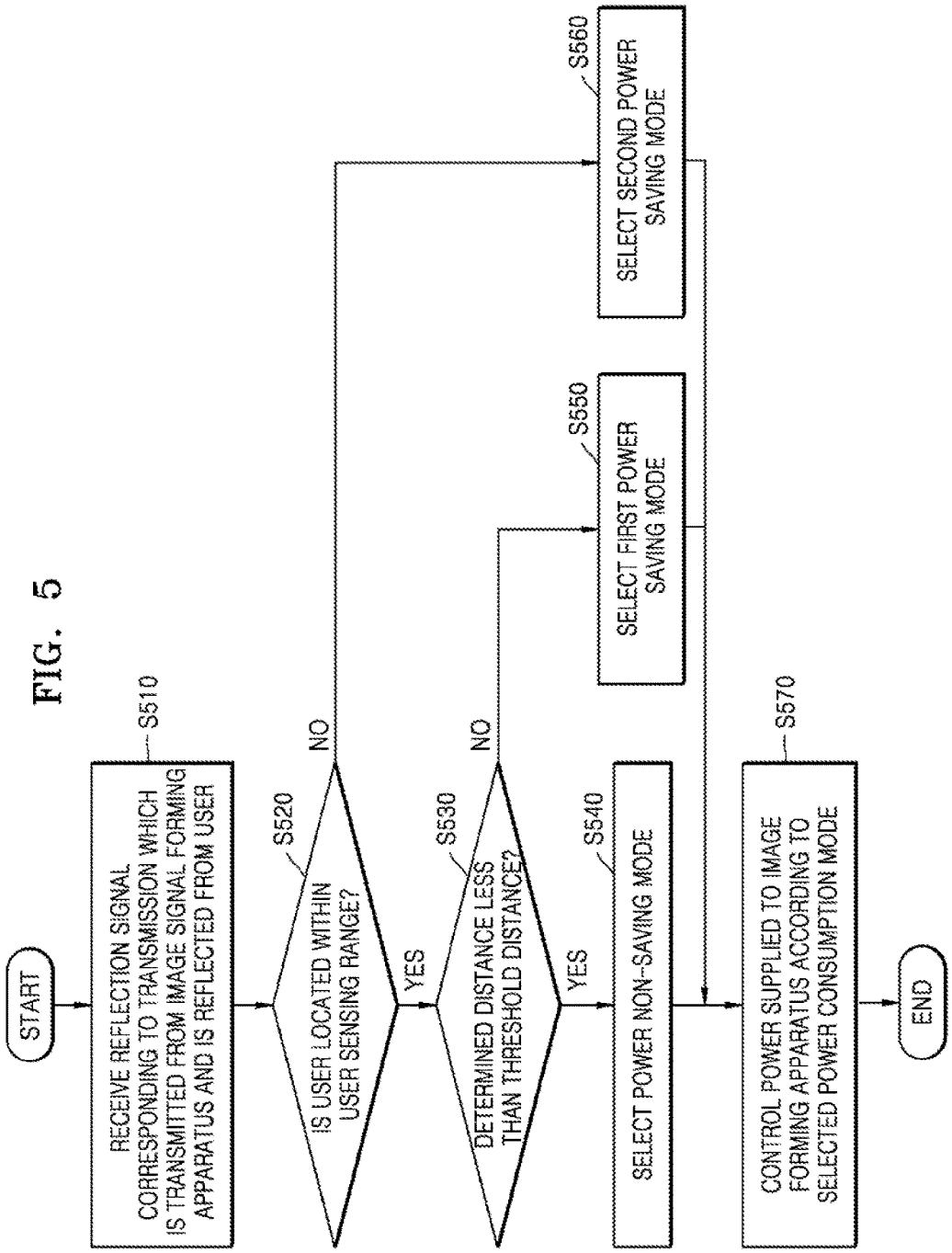
FIG. 5 is a detailed flowchart of a method of determining, by an image forming apparatus, a power consumption mode according to a distance between the image forming apparatus and a user according to an embodiment of the present disclosure.

FIG. 5 is a detailed flowchart of a method of determining, by the image forming apparatus 100, a power consumption mode according to a distance between the image forming apparatus 100 and a user according to an embodiment of the present disclosure.

Referring to FIG. 5, in operation S510, the image forming apparatus 100 may receive a reflection signal corresponding to a transmission signal which is transmitted from the image forming apparatus 100 to a predetermined user sensing area and is reflected from a user.

Operation S510 may correspond to operation S210 described above with reference to FIG. 2.

In operation S520, the image forming apparatus 100 may determine whether the user is located in the user sensing area, based on the received reflection signal.

When the reflection signal corresponding to the transmitted transmission is not sensed, the image forming apparatus 100 may determine whether the user is not located in the user sensing area.

In operation S530, the image forming apparatus 100 may determine whether a distance between the image forming apparatus 100 and the user is less than a threshold distance.

As the reflection signal generated through reflection from the user is sensed, the image forming apparatus 100 according to an embodiment of the present disclosure may determine the user as being located in the user sensing area. Also, the image forming apparatus 100 may determine a location of the user, based on a difference between a time when the transmission signal is transmitted and a time when the reflection signal is received. The image forming apparatus 100 may determine a distance between the image forming apparatus 100 and the user according to the location of the user being determined.

In operation S540, the image forming apparatus 100 may select the power non-saving mode.

When the distance between the image forming apparatus 100 and the user is less than a threshold distance, the image forming apparatus 100 according to an embodiment of the present disclosure may select the power non-saving mode. When the power non-saving mode is selected, power may be supplied to each of the plurality of modules included in the image forming apparatus 100.

In operation S550, the image forming apparatus 100 may select the first power saving mode.

When the distance between the image forming apparatus 100 and the user located in the user sensing area is equal to or more than the threshold distance, the image forming apparatus 100 according to an embodiment of the present disclosure may select the first power saving mode. When the first power saving mode is selected, the power may be supplied to at least one module included in a first module group among the plurality of modules included in the image forming apparatus 100. Here, the at least one module included in the first module group may be determined based on a setting by the user. For example, a plurality of modules included in the first module group may include a signal transceiver, a controller, a random access memory (RAM), and/or the like. However, this is merely one embodiment, and the modules included in the first module group are not limited thereto.

In operation S560, the image forming apparatus 100 may select the second power saving mode.

When the user is not located in the user sensing area, the image forming apparatus 100 according to an embodiment of the present disclosure may select the second power saving mode. When the second power saving mode is selected, the power may be supplied to at least one module included in a second module group among the plurality of modules included in the image forming apparatus 100. Here, the at least one module included in the second module group may be determined based on a setting by the user. For example, a plurality of modules included in the second module group may include a signal transceiver among the plurality of modules. However, this is merely one embodiment, and the modules included in the second module group are not limited thereto.

In operation S570, the image forming apparatus 100 may control the power supplied to the image forming apparatus 100 according to the selected power consumption mode.

When the power non-saving mode is selected, the image forming apparatus 100 according to an embodiment of the present disclosure may supply the power to each of the plurality of modules included in the image forming apparatus 100. Also, when the power non-saving mode is selected and the user is located within a range of less than a threshold distance for a predetermined threshold period of time, the image forming apparatus 100 may obtain authentication information for user authentication from a terminal of the user. The image forming apparatus 100 may authenticate the user, based on the obtained authentication information. When it is determined through the authentication that the user is a registered user, the image forming apparatus 100 may provide an image forming operation to the user.

According to another embodiment, when the first power saving mode is selected, the image forming apparatus 100 may supply the power to at least one module included in the first module group set in the image forming apparatus 100. Here, the image forming apparatus 100 may supply the power to the signal transceiver, the controller, and the RAM.

According to another embodiment, when the second power saving mode is selected, the image forming apparatus 100 may supply the power to at least one module included in the second module group set in the image forming apparatus 100. Here, the image forming apparatus 100 may supply the power to the signal transceiver. When the second power saving mode is selected, the image forming apparatus 100 may supply the power to only the signal transceiver to continuously check the distance between the user and the image forming apparatus 100, thereby preventing the power from being consumed by another module.

Figure 6:
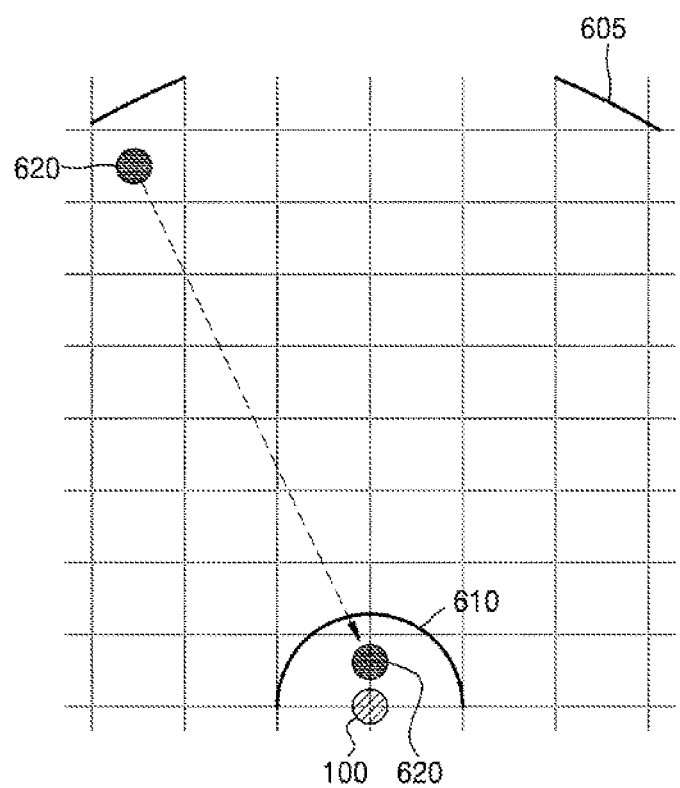
FIG. 6 is a diagram for illustrating a method of sensing, by an image forming apparatus, a location change of a user, to change a power consumption mode according to an embodiment of the present disclosure.

FIG. 6 is a diagram for illustrating a method of sensing, by the image forming apparatus 100, a location change of a user, to change a power consumption mode according to an embodiment of the present disclosure.

Referring to FIG. 6, the image forming apparatus 100 according to an embodiment of the present disclosure may determine a location of a user, based on a reflection signal corresponding to a transmission signal which is transmitted to within a user sensing area 605 and is reflected from a user. Also, the image forming apparatus 100 may sense a reflection signal corresponding to a signal which is transmitted by a predetermined time unit and is reflected from the user, thereby checking a location change of the user.

For example, the image forming apparatus 100 may determine the location of the user, based on a reflection signal corresponding to a signal which is transmitted at a first time and is reflected from a user 620. The image forming apparatus 100 may determine a distance between the user and the image forming apparatus 100 at the first time according to the location of the user being determined. When it is determined that the distance between the user and the image forming apparatus 100 is less than a threshold distance 610, the image forming apparatus 100 may select the first power saving mode as the power consumption mode. Therefore, the image forming apparatus 100 may supply the power to some modules, such the signal transceiver, the controller, and the RAM, among the plurality of modules included in the image forming apparatus 100.

The image forming apparatus 100 may continuously transmit a transmission signal at a predetermined time interval after the first time. The image forming apparatus 100 may determine a location of the user 620, based on a reflection signal corresponding to a signal which is transmitted at a second time and is reflected from the user 620. When the location of the user 620 at the first time differs from that of the user 620 at the second time, the image forming apparatus 100 may re-determine a distance between the user 620 and the image forming apparatus 100. When it is determined that the re-determined distance between the user 620 and the image forming apparatus 100 is less than the threshold distance 610, the image forming apparatus 100 may select the power non-saving mode from among the plurality of power consumption modes. Therefore, the image forming apparatus 100 may supply the power to each of the plurality of modules included in the image forming apparatus 100.

Figure 7:
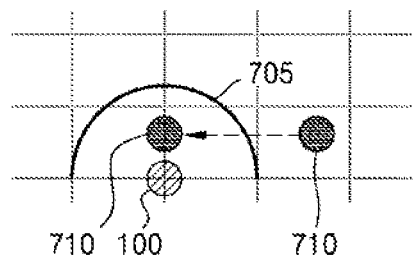
FIG. 7 is a diagram for illustrating a method of obtaining, by an image forming apparatus, user authentication information in a power non-saving mode according to an embodiment of the present disclosure.

FIG. 7 is a diagram for illustrating a method of obtaining, by the image forming apparatus 100, user authentication information in a power non-saving mode according to an embodiment of the present disclosure.

Referring to FIG. 7, the image forming apparatus 100 according to an embodiment of the present disclosure may sense a reflection signal corresponding to a signal which is transmitted by a predetermined time unit and is reflected from a user 710, thereby checking a location change of the user 710. For example, the image forming apparatus 100 may sense a reflection signal corresponding to a transmission signal which is transmitted at a first time and is reflected from the user 710 and a reflection signal corresponding to a transmission signal which is transmitted at a second time and is reflected from the user 710, thereby checking a location change of the user 710.

When the user 710 moves and thus a distance between the image forming apparatus 100 and the user 710 varies to less than a threshold distance 705, the image forming apparatus 100 according to an embodiment of the present disclosure may change the power consumption mode from the first power saving mode to the power non-saving mode.

Moreover, when the power consumption mode is changed to the power non-saving mode, the image forming apparatus 100 according to an embodiment of the present disclosure may determine whether the user 710 is located within the threshold distance 705 for a threshold period of time. When the user 710 is located within the threshold distance 705 for the threshold period of time, the image forming apparatus 100 may obtain user authentication information from a terminal of the user 710. Here, the user authentication information may include a predetermined authentication number and an identification number of the terminal of the user 710. However, this is merely one embodiment, and the user authentication information is not limited thereto.

For example, the image forming apparatus 100 may start to measure a time when the user 710 is located within 1 m, which is the threshold distance 705, from the image forming apparatus 100. When a time for which the user 710 stays in an area within 1 m from the image forming apparatus 100 is equal to or more than 1 sec which is the threshold period of time as a result of the measurement, the image forming apparatus 100 may request the user authentication information from the terminal of the user 710. Also, when the user authentication information is received from the terminal in response to the request, the image forming apparatus 100 may determine whether the user 710 is a registered user, based on the received user authentication information. Therefore, the image forming apparatus 100 may obtain the user authentication information before the user 710 performs an image forming operation, thereby more quickly providing a work environment to the user 710.

Figure 8:
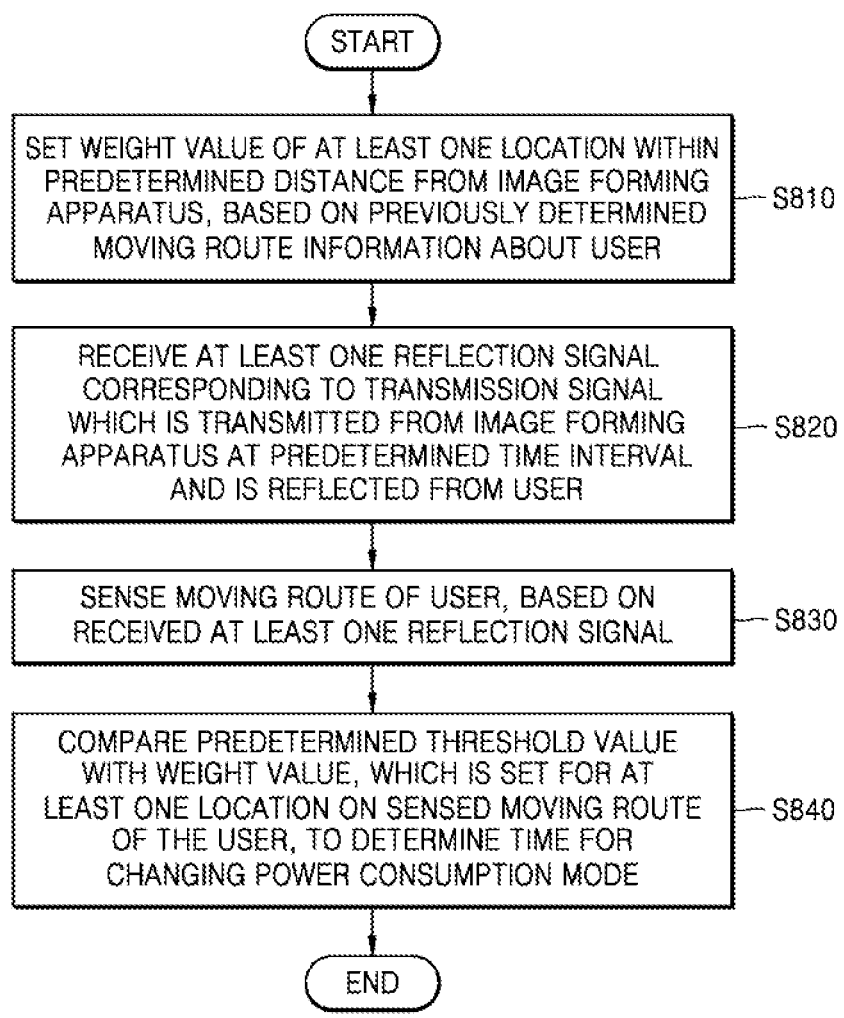
FIG. 8 is a flowchart of a method of selecting, by an image forming apparatus, a time of changing a power consumption mode, by using information about a previously determined moving route of a user according to an embodiment of the present disclosure.

FIG. 8 is a flowchart of a method of selecting, by the image forming apparatus 100, a time of changing a power consumption mode, by using information about a previously determined moving route of a user according to an embodiment of the present disclosure.

Referring to FIG. 8, in operation S810, the image forming apparatus 100 may set a weight value of at least one location within a predetermined distance from the image forming apparatus 100, based on previously determined moving route information about a user.

The image forming apparatus 100 according to an embodiment of the present disclosure may obtain moving route information about the user which has moved in a user sensing area until the user performs an image forming operation. The image forming apparatus 100 may determine a location which is high in probability that the user will move to the location for performing the image forming operation, based on the obtained moving route information for each of a plurality of image forming operations. For example, the image forming apparatus 100 may determine a location, which is high in probability that the user will move to the location, as coordinates on a coordinate plane which is set with respect to the image forming apparatus 100.

Moreover, the image forming apparatus 100 may set a weight value, based on a probability that the user will move to each of the determined locations. Here, the weight value may have a high value when the number of times the user is located for performing the image forming operation is large. This will be described below in detail with reference to FIG. 9.

In operation S820, the image forming apparatus 100 may receive at least one reflection signal corresponding to a transmission signal which is transmitted from the image forming apparatus 100 at a predetermined time interval and is reflected from the user.

The image forming apparatus 100 according to an embodiment of the present disclosure may transmit a transmission signal to a user sensing area at a predetermined time interval. For example, the image forming apparatus 100 may transmit the transmission signal to the user sensing area at an interval of 0.5 sec. Therefore, when the user is located in the user sensing area, the image forming apparatus 100 may receive at least one reflection signal corresponding to each of transmission signals which are transmitted at a predetermined time interval and are reflected from the user.

In operation S830, the image forming apparatus 100 may sense a moving route of the user, based on the received at least one reflection signal.

For example, the image forming apparatus 100 may determine a location of the user at a first time, based on a first reflection signal corresponding to a first transmission signal which is transmitted at the first time and is reflected from the user. Also, the image forming apparatus 100 may determine a location of the user at a second time, based on a second reflection signal corresponding to a second transmission signal which is transmitted at the second time and is reflected from the user.

The image forming apparatus 100 according to an embodiment of the present disclosure may determine a location change of the user, based on a reflection signal corresponding to each of transmission signals which are transmitted at different times and are reflected from the user.

In operation S840, the image forming apparatus 100 may compare a predetermined threshold value with a weight value which is set for at least one location on a sensed moving route of the user, thereby determining a time for changing the power consumption mode.

As a moving route of the user is determined, the image forming apparatus 100 according to an embodiment of the present disclosure may summate weight values which are set for at least one location included in the determined moving route. The image forming apparatus 100 may determine that the user will perform an image forming operation at a time when the sum of the weight values is equal to or more than a predetermined threshold value, thereby changing the power consumption mode.

For example, when a weight value of a location of the user at the first time is 10 and a weight value of a location of the user at the second time is 20, the image forming apparatus 100 may summate the weight values of the locations and may compare the sum of the weight values with the predetermined threshold value. Since 30 which is the sum of the weight values is greater than 20 which is the predetermined threshold value, the image forming apparatus 100 may predict the user will the image forming operation. Accordingly, the image forming apparatus 100 may change the power consumption mode from the first power saving mode to the power non-saving mode at the second time.

Figure 9:
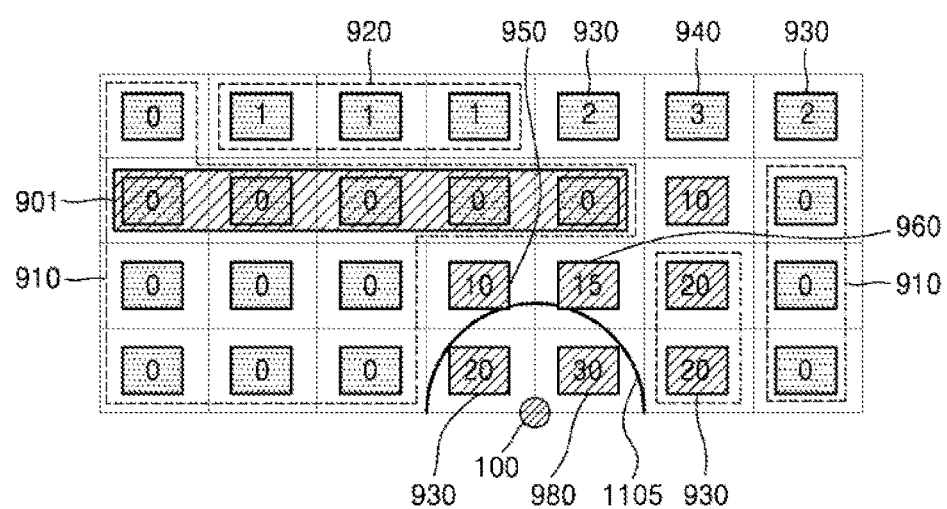
FIG. 9 is a diagram for illustrating a method of setting, by an image forming apparatus, a weight value of each of locations in a user sensing area according to an embodiment of the present disclosure.

FIG. 9 is a diagram for illustrating a method of setting, by the image forming apparatus 100, a weight value of each of locations in a user sensing area according to an embodiment of the present disclosure.

Referring to FIG. 9, when an obstacle 901 such as a wall and/or the like is near the image forming apparatus 100, it is difficult to determine whether a user will perform an image forming operation, based on only a distance between the image forming apparatus 100 and the user. Therefore, the image forming apparatus 100 according to an embodiment of the present disclosure may determine a location which is high in possibility that the user will perform the image forming operation, based on moving route information about the user when the user has previously performed the image forming operation, thereby selecting an appropriate power consumption mode.

The image forming apparatus 100 according to an embodiment of the present disclosure may determine a weight value of each of locations in a user sensing area, based on the moving route information about the user when the user has previously performed the image forming operation. For example, a high weight value may be set for a location where the number of movements of the user before performing the image forming operation is large.

For example, the image forming apparatus 100 may set a weight value of a first location 910, where the user is not sensed in the user sensing area, to 0. Also, the image forming apparatus 100 may set a weight value of a second location 920, where the number of times the user is sensed in the user sensing area is the lowest, to 1. In this way, the image forming apparatus 100 may set weight values of third to seventh locations 930, 940, 950, 960 and 970 to 2, 3, 10, 15, and 20, respectively, based on the number of times the user is sensed in the user sensing area. Also, the image forming apparatus 100 may set a weight value of an eighth location 980, where the number of times the user is sensed in the user sensing area is the highest, to 30.

The image forming apparatus 100 according to an embodiment of the present disclosure may sense a reflection signal corresponding to a transmission signal which is transmitted by a predetermined time unit and is reflected from the user, thereby determining a moving route of the user. The image forming apparatus 100 may check a weight value of at least one location included in the moving route of the user to determine whether the weight value is greater than a threshold value. When a sum of weight values is greater than a predetermined threshold value, the image forming apparatus 100 may change the power consumption mode from the first power saving mode to the power non-saving mode.

For example, when a weight value corresponding to a location of the user is greater than 20 which is the predetermined threshold value, the image forming apparatus 100 may change the power consumption mode from the first power saving mode to the power non-saving mode. Referring to FIG. 9, when the locations 930 and 980 are within the threshold distance 1105 for the threshold period, the image forming apparatus 100 may obtain user authentication information from terminals of users in the locations 930 and 980.

Figure 10A:
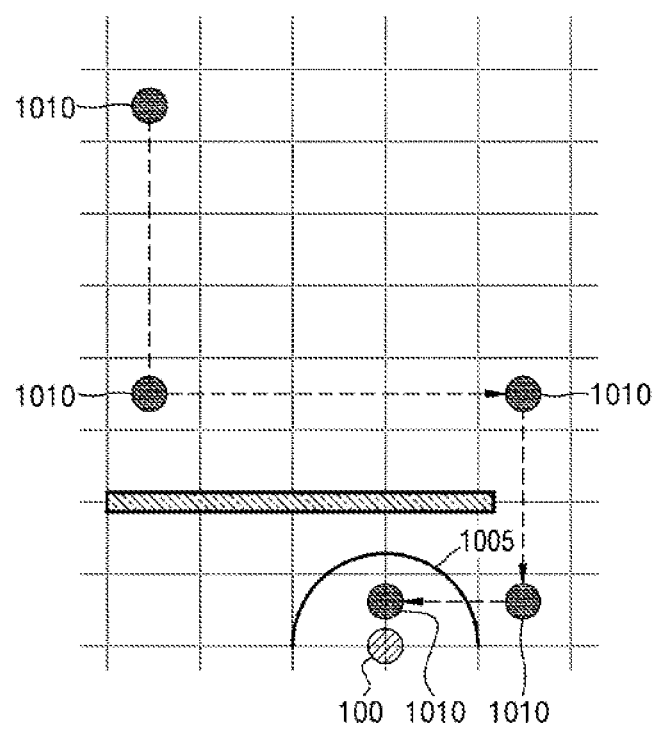
FIGS. 10A and 10B are diagrams for illustrating a method of calculating, by an image forming apparatus, a weight value based on a moving route of a user, to select a power consumption mode according to various embodiments of the present disclosure.
Figure 10B:
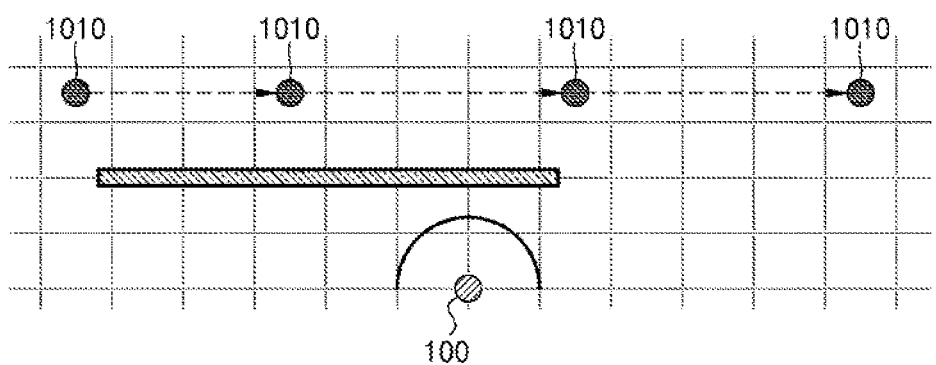

FIGS. 10A and 10B are diagrams for illustrating a method of calculating, by the image forming apparatus 100, a weight value based on a moving route of a user, to select a power consumption mode according to various embodiments of the present disclosure.

Referring to FIG. 10A, when a user is not located in a user sensing area (e.g., within a threshold distance 1005 from the image forming apparatus 100) at a first time, the image forming apparatus 100 cannot sense a reflection signal generated through reflection from the user. The image forming apparatus 100 may sense a reflection signal generated through reflection from the user at a second time, thereby determining a location of the user. The image forming apparatus 100 may determine a weight value corresponding to the location of the user 1010 according to the location of the user 1010 being determined. Here, the weight value corresponding to the location of the user 1010 at the second time is assumed to be 0. Also, the image forming apparatus 100 may sense a reflection signal generated through reflection from the user at a third time, thereby determining a location of the user 1010 at the third time. Here, the weight value corresponding to the location of the user 1010 at the third time is assumed to be 10.

The image forming apparatus 100 may sense a reflection signal generated through reflection from the user 1010 at a fourth time, thereby determining a location of the user 1010 at the fourth time. Here, the weight value corresponding to the location of the user 1010 at the fourth time is assumed to be 25. The image forming apparatus 100 according to an embodiment of the present disclosure may check a weight value corresponding to a location of the user 1010 at each of the first to fourth times. When a weight value at the fourth time is greater than a threshold value, the image forming apparatus 100 may change the power consumption mode of the image forming apparatus 100 from the first power saving mode to the power non-saving mode.

As the power consumption mode is changed to the power non-saving mode, the image forming apparatus 100 according to an embodiment of the present disclosure may supply power to each of the plurality of modules included in the image forming apparatus 100. Also, when the power non-saving mode is maintained for a threshold period of time or more, the image forming apparatus 100 may obtain authentication information from the user to authenticate the user.

Referring to FIG. 10B, the image forming apparatus 100 may determine a location of the user 1010 at each of the first to fourth times by using each of reflection signals corresponding to a transmission signal which is transmitted by a predetermined time unit and is reflected from the user.

The image forming apparatus 100 may check that a weight value at each of the first to third times increases, but a weight value at the fourth time decreases. Accordingly, the image forming apparatus 100 may maintain the power consumption mode as the first power saving mode.

The user may move to deviate from the user sensing area, and thus, when a reflection signal generated through reflection from the user is not sensed by the image forming apparatus 100, the image forming apparatus 100 may change the power consumption mode from the first power saving mode to the second power saving mode.

As described above with reference to FIGS. 10A and 10B, the image forming apparatus 100 according to an embodiment of the present disclosure may perform authentication only when there is a high possibility that the user will perform an image forming operation, thereby reducing consumption of power used to perform the authentication.

Figure 11:
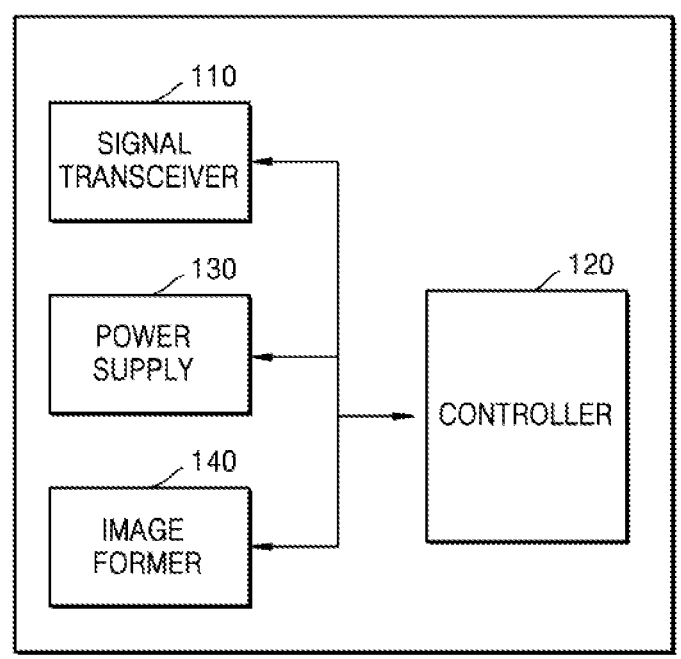
FIGS. 11 and 12 are block diagrams of an image forming apparatus according to various embodiments of the present disclosure.
Figure 12:
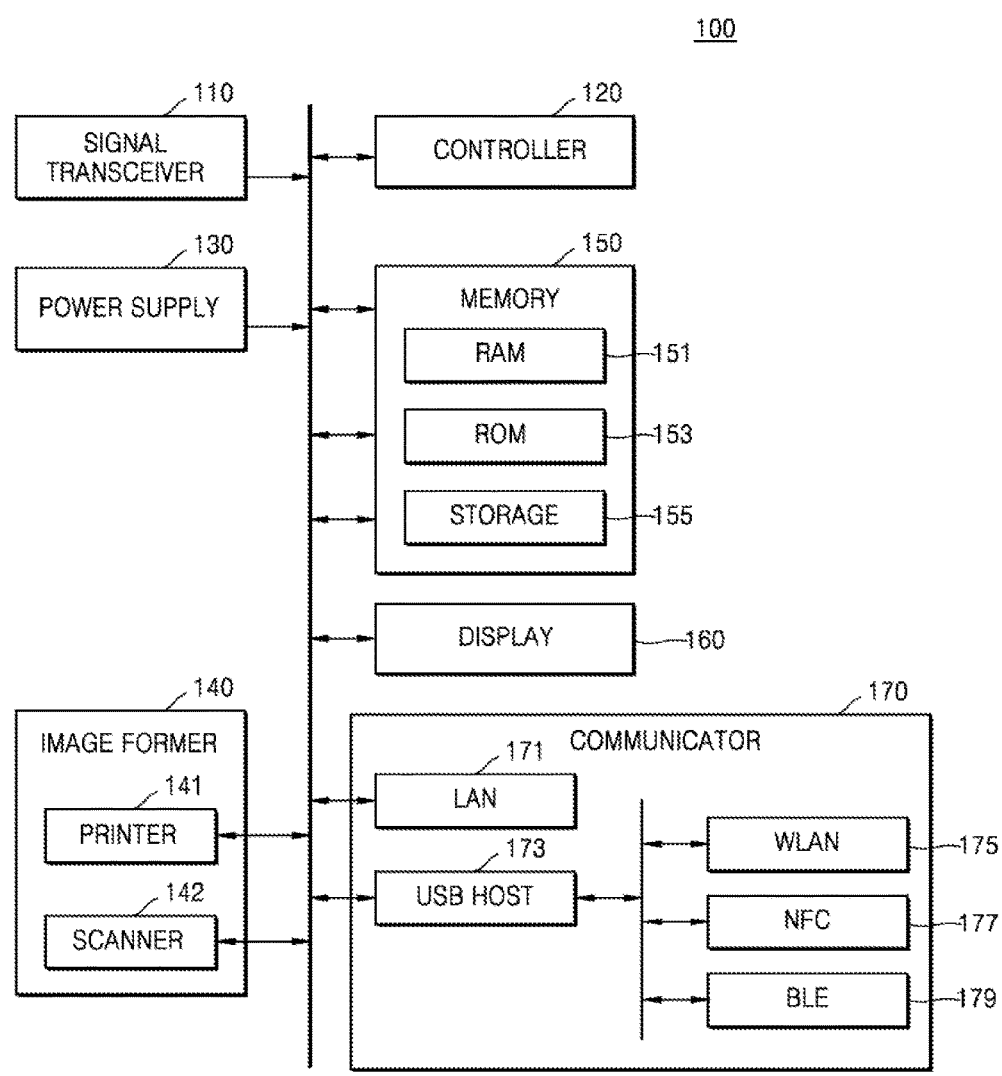

FIGS. 11 and 12 are block diagrams of an image forming apparatus 100 according to various embodiments of the present disclosure.

Referring to FIG. 11, the image forming apparatus 100 according to an embodiment of the present disclosure may include a signal transceiver 110, a controller 120, a power supply 130, and an image former 140. However, all of the elements are not essential elements. The image forming apparatus 100 may include additional elements, in addition to the illustrated elements. Alternatively, the image forming apparatus 100 may include fewer elements than the number of illustrated elements.

For example, referring to FIG. 12, the image forming apparatus 100 according to an embodiment of the present disclosure may further include a memory 150, a display 160, and a communicator 170, in addition to the signal transceiver 110, the controller 120, the power supply 130, and the image former 140.

The image forming apparatus 100 of FIGS. 11 and 12 may correspond to the image forming apparatus 100 described above with reference to FIGS. 1 to 3, 4A and 4B, and 5 to 9.

The signal transceiver 110 may receive a reflection signal corresponding to a transmission signal which is transmitted from the image forming apparatus 100 to a predetermined user sensing area and is reflected from a user.

The controller 120 may determine a distance between the image forming apparatus 100 and the user, based on the received reflection signal. Also, the controller 120 may select a power consumption mode corresponding to the determined distance from among a plurality of predetermined power consumption modes, based on the distance between the image forming apparatus 100 and the user. For example, when the distance between the image forming apparatus 100 and the user is less than a threshold distance, the controller 120 may select a power non-saving mode. Also, when the distance between the image forming apparatus 100 and the user is equal to or more than the threshold distance in a user sensing area, the controller 120 may select a first power saving mode. Also, when the user is located outside the user sensing area and thus a reflection signal is not received, the controller 120 may select a second power saving mode. According to another embodiment, when the reflection signal is not received and power of the image forming apparatus 100 is less than a predetermined value, the controller 120 may select the second power saving mode.

The controller 120 according to an embodiment of the present disclosure may set a weight value of at least one location within a user sensing range, based on previously determined moving path information about the user. The controller 120 may determine coordinates representing a location of the user on a coordinate plane which is set with respect to the image forming apparatus 100, and may determine a weight value corresponding to the determined coordinates.

Moreover, the controller 120 may sense a moving route of the user, based on a reflection signal received by a predetermined time unit. The controller 120 may compare a predetermined threshold value with a weight value corresponding to at least one location on the sensed moving route of the user to determine a time for changing the power consumption mode.

The power supply 130 may supply the power to the image forming apparatus 100, based on the selected power consumption mode. For example, when the power non-saving mode is selected, the power supply 130 may supply the power to each of a plurality of modules included in the image forming apparatus 100. According to another embodiment, when the first power saving mode is selected, the power supply 130 may supply the power to at least one module included in a first module group among the plurality of modules included in the image forming apparatus 100. For example, when the first power saving mode is selected, the power supply 130 may supply the power to the signal transceiver 110, the controller 120, and an RAM 151. According to another embodiment, when the second power saving mode is selected, the power supply 130 may supply the power to at least one module included in a second module group among the plurality of modules included in the image forming apparatus 100. For example, when the second power saving mode is selected, the power supply 130 may supply the power to the signal transceiver 110.

The image former 140 may perform an image forming operation, such as printing, copying, scanning, or the like, according to a command of a user. Here, the image former 140 may include a printer 141 and a scanner 142.

The memory 150 may store a program for processing and control by the controller 120 and may store input/output data.

The memory 150 may include a storage medium such as the RAM 151, a read-only memory (ROM) 153, and a storage 155. However, this is merely one embodiment, and is not limited thereto. For example, the memory 150 may include a storage medium of at least one type of a flash memory type, a hard disk type, a multimedia card micro type, a card type memory (for example, a secure digital (SD) memory, an extreme digital (XD) memory, or the like). Also, the image forming apparatus 100 may operate a web storage or a cloud server for performing a storage function of the memory 150 on the Internet.

The display 160 may display a user interface (UI) screen. For example, the display 160 may display the UI screen including manual information so as to perform the image forming operation. Also, the display 160 may display the UI screen which enables a setting of a distance corresponding to each of the plurality of power consumption modes.

The display 160 may be implemented with a touch screen which enables a touch input.

The communicator 160 may include one or more elements for performing communication between the image forming apparatus 100 and another device or between the image forming apparatus 100 and a server. For example, the communicator 160 may include a local area network (LAN) communicator 171, a universal serial bus (USB) host 173, a wireless LAN (WLAN) communicator 175, a near field communication (NFC) communicator 177, and a Bluetooth (BT) communicator 179, but is not limited thereto.

The communicator 160 according to an embodiment of the present disclosure may communicator with a terminal of a user to obtain authentication information necessary for authentication of the user.

Figure 13:
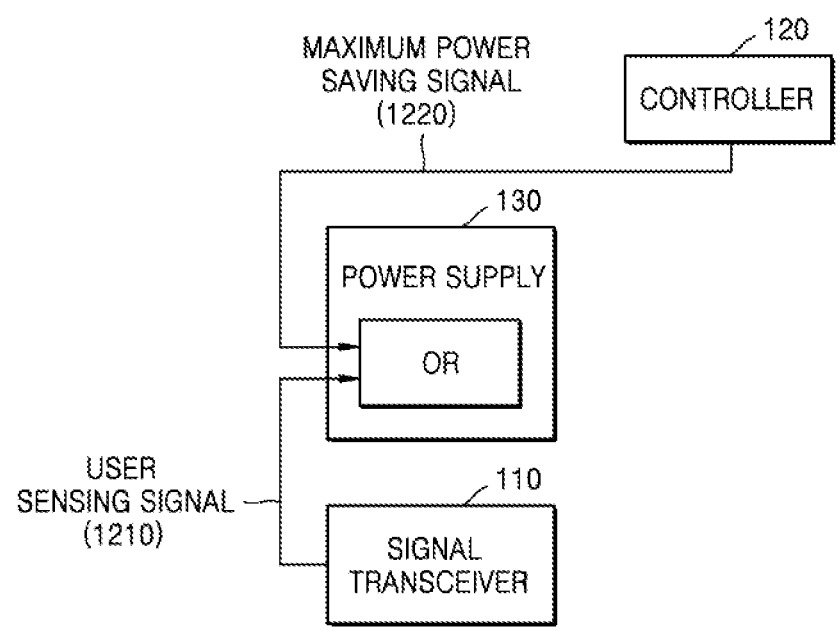
FIG. 13 is a diagram for illustrating in detail operations of a signal transceiver, a controller, and a power supply among a plurality of modules included in an image forming apparatus according to an embodiment of the present disclosure.

FIG. 13 is a diagram for illustrating in detail operations of a signal transceiver 110, a controller 120, and a power supply 130 among a plurality of modules included in an image forming apparatus 100 according to an embodiment of the present disclosure.

Referring to FIG. 13, the signal transceiver 110, the controller 120, and the power supply 130 may respectively correspond to the signal transceiver 110, the controller 120, and the power supply 130 described above with reference to FIGS. 11 and 12.

When a reflection signal generated through reflection from a user is sensed, the signal transceiver 110 according to an embodiment of the present disclosure may set a user sensing signal 1210 to 1 and may transmit the user sensing signal 1210 to the power supply 130. On the other hand, when the reflection signal is not sensed, the signal transceiver 110 may set the user sensing signal 1210 to 0 and may transmit the user sensing signal 1210 to the power supply 130.

Moreover, when power capable of being supplied from the image forming apparatus 100 is less than a predetermined value, the controller 120 according to an embodiment of the present disclosure may set a maximum power saving signal 1220 to 0 and may transmit the maximum power saving signal 1220 to the power supply 130. On the other hand, when the power capable of being supplied from the image forming apparatus 100 is equal to or more than the predetermined value, the controller 120 may set the maximum power saving signal 1220 to 1 and may transmit the maximum power saving signal 1220 to the power supply 130.

The power supply 130 according to an embodiment of the present disclosure may perform an OR operation based on a value of each of the user sensing signal 1210 and the maximum power saving signal 1220 to select the second power saving mode as the power consumption mode. For example, when 0 is calculated as a result of performing the OR operation on the value of each of the user sensing signal 1210 and the maximum power saving signal 1220, the power supply 120 may select the second power saving mode as the power consumption mode.

An apparatus according to the various embodiments may include a processor, a memory storing and executing program data, a permanent storage such as a disk drive, a communication port for communication with an external device, a UI device such as a touch panel, keys or buttons, and the like. Methods embodied as a software module or an algorithm may be stored on a computer-readable recording medium as computer readable codes or program commands executable by the processor. Examples of the computer-readable recording medium include magnetic storage media (e.g., ROM, floppy disks, hard disks, etc.), optical recording media (e.g., compact disc-ROMs (CD-ROMs), or digital versatile discs (DVDs)), and the like. The computer-readable recording medium may also be distributed over network-coupled computer systems so that the computer readable code is stored and executed in a distributed fashion. The medium may be read by a computer, stored in a memory, and executed by the processor.

All the documents including the public laid open documents, patent applications, patent documents, and the like cited in the various embodiments may be merged into the various embodiments in the same manner as that indicated by individually or specifically merging the respective cited documents or as that indicated by merging them overall in the inventive concept.

To aid in understanding the embodiments, reference numerals are used in the various embodiments shown in the drawings, and specific terms are used to explain the embodiments; however, they are not intended to limit the various embodiments and may represent all the components that could be considered by those of ordinary skill in the art.

The various embodiments may be embodied as functional blocks and various processing operations. The functional blocks may be implemented with various hardware and/or software configurations executing specific functions. For example, the various embodiments employs integrated circuit configurations such as a memory, processing, logic, a look-up table and the like capable of executing various functions upon control of microprocessors or other control devices. In a similar manner to that in which the elements of the inventive concept may be executed with software programming or software elements, the various embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the inventive concept may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the inventive concept in any way. For simplicity of description, other functional aspects of electronic configurations of the related art, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements may not be inevitably required elements for the application of the inventive concept unless they are specifically mentioned as being "essential" or "critical."

According to the embodiments, a user may determine whether to use the image forming operation in the image forming apparatus and may select the power saving mode according to a result of the determination, thereby more efficiently managing power consumed by the image forming apparatus.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an image forming apparatus, the method comprising:
    setting a weight value of at least one location in a user sensing area, based on a probability that the user will move to a location for performing an image forming operation;
    receiving a reflection signal corresponding to a transmission signal transmitted from the image forming apparatus to the user sensing area, the reflection signal reflected from the user;
    determining a location of the user based on the received reflection signal;
    determining a distance between the image forming apparatus and the user based on the determined location of the user;
    selecting a power consumption mode, from among a plurality of power consumption modes, based on the determined distance between the image forming apparatus and the user; and
    performing user authentication or power control according to the selected power consumption mode,
    wherein a time for selecting the power consumption mode is based on the set weight value.

2. The method of claim 1,
    wherein the plurality of power consumption modes comprises a power saving mode and a power non-saving mode,
    wherein, in the power saving mode, power is supplied to some of a plurality of modules included in the image forming apparatus, and
    wherein, in the power non-saving mode, power is supplied to each of the plurality of modules.

3. The method of claim 2,
    wherein the power saving mode includes a first power saving mode and a second power saving mode, based on a type of module supplied with power among the plurality of modules,
    wherein, when the determined distance between the image forming apparatus and the user is less than a threshold distance in the user sensing area, the selecting of the power consumption mode comprises selecting the power non-saving mode,
    wherein, when the determined distance between the image forming apparatus and the user is equal to or more than the threshold distance in the user sensing area, the selecting of the power consumption mode comprises selecting the first power saving mode, and
    wherein, when the user is located outside the user sensing area and the reflection signal is not received, the selecting of the power consumption mode comprises selecting the second power saving mode.

4. The method of claim 1, wherein the performing of the user authentication or the power control comprises, when the user is located within a certain distance from the image forming apparatus for a threshold period of time or more, obtaining authentication information necessary for the user authentication from a terminal of the user.

5. The method of claim 1, further comprising:
    determining coordinates representing the location of the user on a coordinate plane which is set with respect to the image forming apparatus; and
    determining a weight value corresponding to the determined coordinates.

6. The method of claim 1, further comprising:
    sensing a moving route of the user, based on the reflection signal received by a certain time unit; and
    comparing a threshold value with a weight value corresponding to at least one location on the sensed moving route of the user to determine the time for selecting the power consumption mode.

7. The method of claim 1, wherein the transmission signal comprises an ultra-wide band (UWB) radar signal.

8. The method of claim 1, further comprising:
    determining an output intensity of the transmission signal, based on the user sensing area.

9. The method of claim 1, wherein the weight value varies based on a number of times the user is located in the at least one location for performing an image forming operation.

10. An image forming apparatus comprising:
    an image former to perform an image forming operation;
    a signal transceiver to receive a reflection signal corresponding to a transmission signal transmitted from the image forming apparatus to a user sensing area and reflected from a user;
    at least one processor to:
        set a weight value of at least one location in a user sensing area, based on a probability that the user will move to a location for performing the image forming operation, determine a location of the user based on the received reflection signal, determine a distance between the image forming apparatus and the user based on the determined location of the user, and select a power consumption mode, from among a plurality of power consumption modes, based on the determined distance between the image forming apparatus and the user; and a power supply to supply power to the image forming apparatus, based on the selected power consumption mode, wherein the at least one processor performs user authentication or power control according to the selected power consumption mode, and wherein a time for selecting the power consumption mode is based on the set weight value.

11. The image forming apparatus of claim 10, wherein the plurality of power consumption modes comprises a power saving mode and a power non-saving mode, wherein, in the power saving mode, power is supplied to some of a plurality of modules included in the image forming apparatus, and wherein, in the power non-saving mode, power is supplied to each of the plurality of modules.

12. The image forming apparatus of claim 11, wherein the power saving mode includes a first power saving mode and a second power saving mode, based on a type of module supplied with the power among the plurality of modules, wherein, when the determined distance between the image forming apparatus and the user is less than a threshold distance in the user sensing area, the at least one processor selects the power non-saving mode, wherein, when the determined distance between the image forming apparatus and the user is equal to or more than the threshold distance in the user sensing area, the at least one processor selects the first power saving mode, and wherein, when the user is located outside the user sensing area and the reflection signal is not received, the at least one processor selects the second power saving mode.

13. The image forming apparatus of claim 10, further comprising:

a communicator to, when the user is located within a certain distance from the image forming apparatus for a threshold period of time or more, obtain authentication information necessary for the user authentication from a terminal of the user.

14. The image forming apparatus of claim 10, wherein the at least one processor:

determines coordinates representing the location of the user on a coordinate plane which is set with respect to the image forming apparatus, and determines a weight value corresponding to the determined coordinates.

15. The image forming apparatus of claim 10, wherein the at least one processor:

senses a moving route of the user, based on a reflection signal received by a certain time unit, and compares a threshold value with a weight value corresponding to at least one location on the sensed moving route of the user to determine the time for selecting the power consumption mode.

16. The image forming apparatus of claim 10, wherein the transmission signal comprises an ultra-wide band (UWB) radar signal.

17. The image forming apparatus of claim 10, wherein the at least one processor determines an output intensity of the transmission signal, based on the user sensing area.

18. The image forming apparatus of claim 10, wherein the weight value varies based on a number of times the user is located in the at least one location for performing the image forming operation.

19. A non-transitory computer-readable recording medium having recorded thereon instructions, executable by at least one processor, to control an image forming apparatus, the non-transitory computer-readable recording medium comprising:

instructions to set a weight value of at least one location in a user sensing area, based on a probability that the user will move to a location for performing an image forming operation;

instructions to receive a reflection signal corresponding to a transmission signal transmitted from the image forming apparatus to the user sensing area, the reflection signal reflected from the user;

instructions to determine a location of the user based on the received reflection signal;

instructions to determine a distance between the image forming apparatus and the user based on the determined location of the user;

instructions to select a power consumption mode, from among a plurality of power consumption modes, based on the determined distance between the image forming apparatus and the user; and instructions to perform user authentication or power control according to the selected power consumption mode, wherein a time for selecting the power consumption mode is based on the set weight value.

20. The non-transitory computer-readable recording medium of claim 19, wherein the weight value varies based on a number of times the user is located in the at least one location for performing an image forming operation.

* * * * *